United States Patent
Houle

(10) Patent No.: US 8,557,127 B2
(45) Date of Patent: Oct. 15, 2013

(54) APPARATUS AND METHOD FOR REMOVING SOLID DEBRIS FROM SLURRY PROCESSING SYSTEM

(76) Inventor: Rejean Houle, Tulare, CA (US)

( * ) Notice: Subject to any disclaimer, the term of this patent is extended or adjusted under 35 U.S.C. 154(b) by 81 days.

(21) Appl. No.: 13/282,398

(22) Filed: Oct. 26, 2011

(65) Prior Publication Data

US 2013/0105369 A1    May 2, 2013

(51) Int. Cl.
B01D 37/00    (2006.01)
B01D 29/64    (2006.01)

(52) U.S. Cl.
USPC ........... 210/768; 210/255; 210/526; 210/528; 210/413; 209/241; 209/17; 209/273; 119/451

(58) Field of Classification Search
None
See application file for complete search history.

(56) References Cited

U.S. PATENT DOCUMENTS

| | | | |
|---|---|---|---|
| 1,703,726 A | 2/1929 | Davis | |
| 1,729,965 A | 10/1929 | Reynolds | |
| 2,061,812 A | 11/1936 | Slater | |
| 2,091,503 A | 8/1937 | Ferriss, Sr. | |
| 2,095,504 A * | 10/1937 | Kesti et al. | 210/160 |
| 3,568,839 A * | 3/1971 | Dunlea | 210/194 |
| 3,666,091 A * | 5/1972 | Ludlum | 209/44.1 |
| 3,929,642 A | 12/1975 | Ennis | |
| 3,950,562 A | 4/1976 | Senior | |
| 4,113,626 A | 9/1978 | Detcher | |
| 4,664,790 A | 5/1987 | Lundqvist | |
| 4,666,602 A * | 5/1987 | Hartzell | 210/298 |
| 4,990,249 A * | 2/1991 | Leuenberger | 210/167.31 |
| 5,268,100 A * | 12/1993 | Hartzell | 210/396 |
| 5,330,643 A | 7/1994 | Webb et al. | |
| 5,413,709 A | 5/1995 | Webb et al. | |
| 5,429,247 A | 7/1995 | Lemay et al. | |
| 5,628,912 A * | 5/1997 | Nesseth | 210/768 |
| 5,779,887 A * | 7/1998 | Rector et al. | 210/159 |
| 5,817,241 A * | 10/1998 | Brayboy | 210/800 |
| 5,832,873 A * | 11/1998 | Tu | 119/479 |
| 5,833,868 A * | 11/1998 | Bajema | 210/788 |
| 5,927,513 A | 7/1999 | Hart | |
| 6,190,570 B1 * | 2/2001 | Nakamura et al. | 210/776 |
| 6,241,900 B1 * | 6/2001 | Nakamura et al. | 210/769 |
| 6,273,270 B1 * | 8/2001 | Nakamura et al. | 210/386 |
| 6,354,442 B1 | 3/2002 | Obst | |
| 6,531,057 B1 | 3/2003 | Houle | |
| 6,672,462 B2 | 1/2004 | Sharkey | |
| 6,749,068 B1 | 6/2004 | Dias | |

(Continued)

OTHER PUBLICATIONS

Office action mailed Jan. 2, 2013 in co-pending U.S. Appl. No. 13/282,403, 6 pages.

(Continued)

*Primary Examiner* — Robert James Popovics
(74) *Attorney, Agent, or Firm* — Lewis Roca Rothgerber LLP

(57) ABSTRACT

A separator system for separating the solids debris from a slurry flowing over a spillway from a storage pit includes a horizontal conveyor horizontally disposed across a flowpath of the slurry below the spillway and including a channel defined by a pair of opposed side members extending upward from a bottom plate having a pattern of perforations formed therein. A plurality of spaced apart paddles oriented in a direction parallel to the channel are fixed to continuous conveyor drive running along the bottom of the trough. A conveyor has a pickup end disposed below the downstream end of the trough and is positioned to catch solid debris that has been carried along by the paddles and convey the solid debris out of the slurry stream.

6 Claims, 2 Drawing Sheets

(56) References Cited

U.S. PATENT DOCUMENTS

| | | |
|---|---|---|
| 6,773,612 B2 | 8/2004 | Dias |
| 6,863,181 B2 | 3/2005 | Dias |
| 6,892,891 B2 | 5/2005 | Dias |
| 6,899,807 B2 * | 5/2005 | Cummings ............. 210/97 |
| 6,926,839 B2 | 8/2005 | Sharkey |
| 7,051,962 B2 * | 5/2006 | Whitsel et al. ............ 241/73 |
| 7,122,119 B2 * | 10/2006 | Gribble et al. ........... 210/232 |
| 7,673,755 B2 | 3/2010 | Gemmill |
| 8,147,689 B1 * | 4/2012 | Cogar ................... 210/173 |
| 8,302,780 B1 * | 11/2012 | Mitchell et al. ............ 210/391 |
| 2001/0004973 A1 | 6/2001 | Asakawa |
| 2001/0013492 A1 | 8/2001 | Dias |
| 2003/0089644 A1 | 5/2003 | Hanks |
| 2003/0094424 A1 | 5/2003 | Dias |
| 2003/0116511 A1 | 6/2003 | Dias |
| 2003/0127375 A1 * | 7/2003 | Gribble et al. ........... 210/101 |
| 2004/0245152 A1 | 12/2004 | Dias |
| 2012/0273403 A1 * | 11/2012 | Daniels et al. ......... 210/170.01 |
| 2013/0105369 A1 * | 5/2013 | Houle ..................... 209/240 |
| 2013/0105409 A1 * | 5/2013 | Houle ..................... 210/770 |
| 2013/0105413 A1 * | 5/2013 | Houle ..................... 210/785 |

OTHER PUBLICATIONS

U.S. Appl. No. 13/282,395 entitled "Three-Stage Slurry Processing Apparatus and Method" filed Oct. 26, 2011, 20 pages.

U.S. Appl. No. 13/282,403 entitled "Vibrating Slot Sieve Slurry Processing Apparatus and Method" filed Oct. 26, 2011, 18 pages.

* cited by examiner

APPARATUS AND METHOD FOR REMOVING SOLID DEBRIS FROM SLURRY PROCESSING SYSTEM

BACKGROUND

1. Field of the Invention

The present invention relates to processing of slurries. More particularly, the present invention relates to apparatus and methods for removing solid debris from slurry processing systems.

2. The Prior Art

Many processes in industries such as farming, the food and beverage industry and others, involve the handling of slurries including mixtures of solids and liquids. In a large number of these processes, it becomes necessary at some point to separate the solid components of the slurries from the liquid components of the slurries. A non-exhaustive list of examples of slurries include manure, beer and wine sludge, nut and grain hulls and other food products.

There are numerous reasons to separate out liquid components of slurries. Such purposes include, but are not limited to, waste water processing, clean water recovery, weight reduction prior to hauling solid waste components of a process to reduce transportation costs.

One particular application of the need for separation of solids and liquids from slurries is found in dairy farming. On dairy farms, dairy cows eat and walk on concrete flush lanes. While in these lanes, the cows excrete solid and liquid waste, approximately 15 to 20 gallons of solid waste per cow per day. The solid waste is a valuable commodity and is used for fertilizing as well as creating bedding for cows. Thus, dairy farms pump water from large storage lagoons into the dairy cow flush lanes in order to flush the lanes and collect the solid and liquid waste, in a storage pit from which it is mixed and pumped over a screen separator to remove the solids from the water.

It is known in the art to pump the flushed water, that is water that has already been flushed down the dairy cow flush lane, to a solid waste separator. Water from the flush lanes is directed into a holding lagoon or pit from which it is directed into a solid waste separator system. Some slurry separators and solid waste separators, including ones in use in dairy farming operations, employ components such as roller presses and screw presses in later stages to separate the solid and liquid components of slurries, etc.

One problem that arises in such separator systems is the presence of large solid debris in the waste slurry. This debris takes many forms, and can include pieces of wood, metal, glass, plastic and other materials. Some of these materials can damage or clog components such as roller presses and screw presses, requiring additional maintenance and/or repair, resulting in extra cost and system downtime.

BRIEF DESCRIPTION

According to a first aspect of the present invention, apparatus and methods for separating solid debris from a slurry are disclosed. A debris separator is positioned below the spillway of a dam outlet of a storage pit or lagoon such that a slurry pumped in behind the dam flowing over the spillway passes through the separator. The debris separator includes a horizontal conveyor disposed in the flowpath below the spillway. The conveyor is formed as a trough including a channel defined by a pair of opposed side members extending upward from a bottom plate having a pattern of perforations, preferably in the form of slots running across its length.

A series of spaced apart paddles are coupled to a driven continuous conveying chain or belt that runs along the bottom of the trough. The paddles are positioned across the width of the channel and continuously move with the belt or chain to which they are coupled. The perforations in the bottom of the channel are sized large enough to pass the slurry including any suspended solids normally encountered in the slurry being processed but small enough to trap solid debris having physical dimensions too large to pass through them. The downstream end of the trough, towards which the paddles continuously move, is open, allowing the paddles to be pulled by the belt or chain around a pulley or wheel and then pass under the trough in the opposite direction of travel. A conveyor belt is positioned below the downstream end of the trough and positioned to catch solid debris that has been carried along by the paddles and convey the solid debris to a holding pile or waste container.

BRIEF DESCRIPTION OF THE DRAWING FIGURES

DETAILED DESCRIPTION

Figure 1:
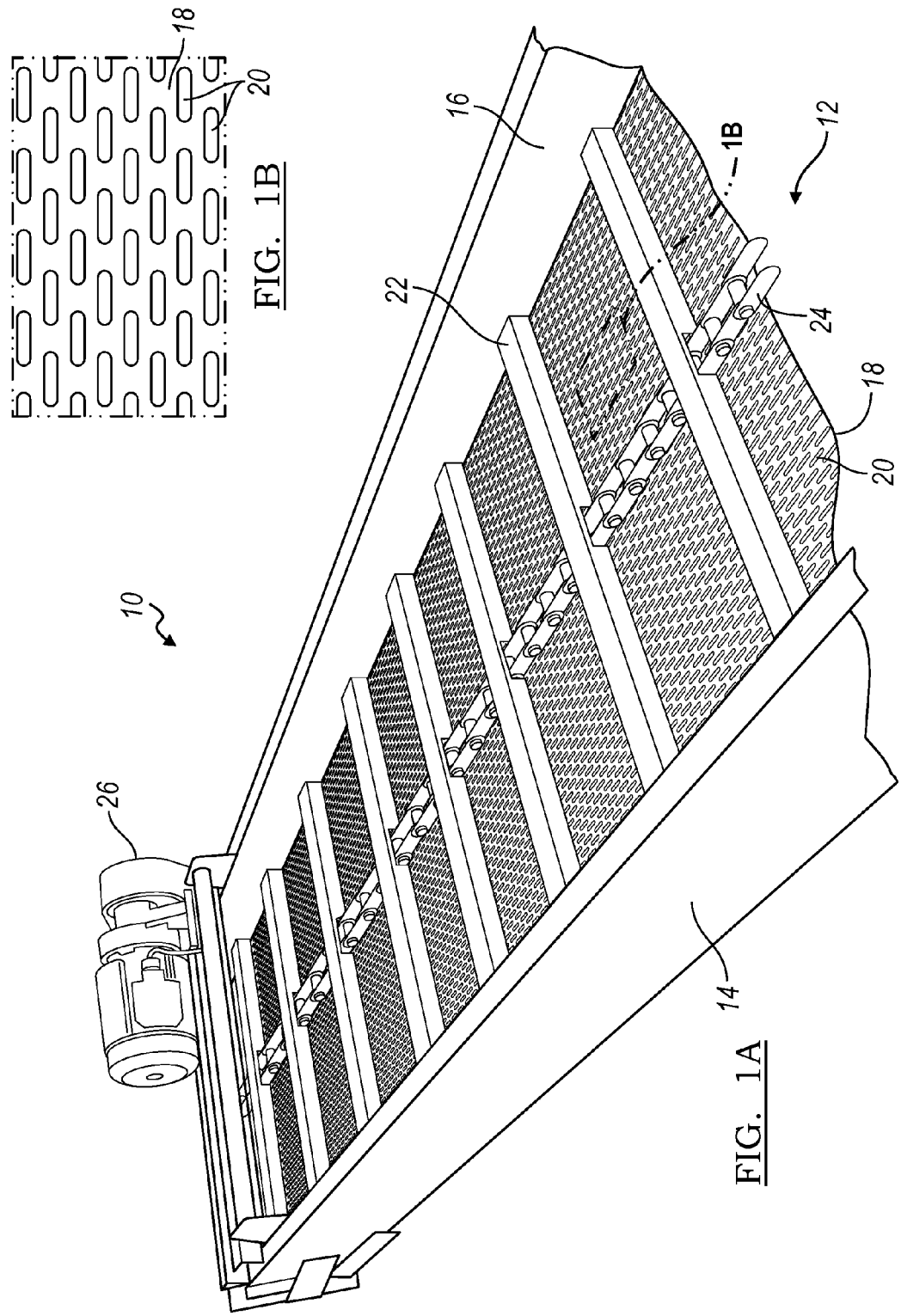
FIG. 1A is a perspective view of a debris separator section of the kind that may be used in practicing the present invention.
FIG. 1B is a close-up view of an exemplary bottom plate for a debris separator of the kind that may be used in practicing the present invention.

Persons of ordinary skill in the art will realize that the following description of the present invention is illustrative only and not in any way limiting. Other embodiments of the invention will readily suggest themselves to such skilled persons.

Referring now to FIG. 1A, a perspective view shows a debris separator section 10 of the kind that may be used in practicing the present invention. The debris separator 10 is formed as a trough including a channel 12 defined by a pair of opposed side members 14 and 16 extending upward from a bottom plate 18.

As may be seen more clearly in FIG. 1B, a close-up view of a portion of an exemplary bottom plate 18 shows that bottom plate 18 has a pattern of apertures 20, preferably in the form of slots running across its length. The bottom plate may be formed from, for example, a 250×1000-OS-SS-W plate available from Diamond Perforated Metals, Inc., of Visalia Calif. The close-up view of FIG. 1B shows a plurality of offset oval slots 0.250" wide and 1.000" long. Persons of ordinary skill in the art will appreciate that other aperture patterns and sizes may be employed depending on the slurry to be past and the dimensions of the solid debris to be removed.

Referring again to FIG. 1A, a number of spaced-apart paddles 22 are driven by a continuous conveyor chain 24 that loops around the bottom surface of bottom plate 18. As will be appreciated by persons of ordinary skill in the art, conveyor chain 18 is driven by motor 26.

Figure 2:
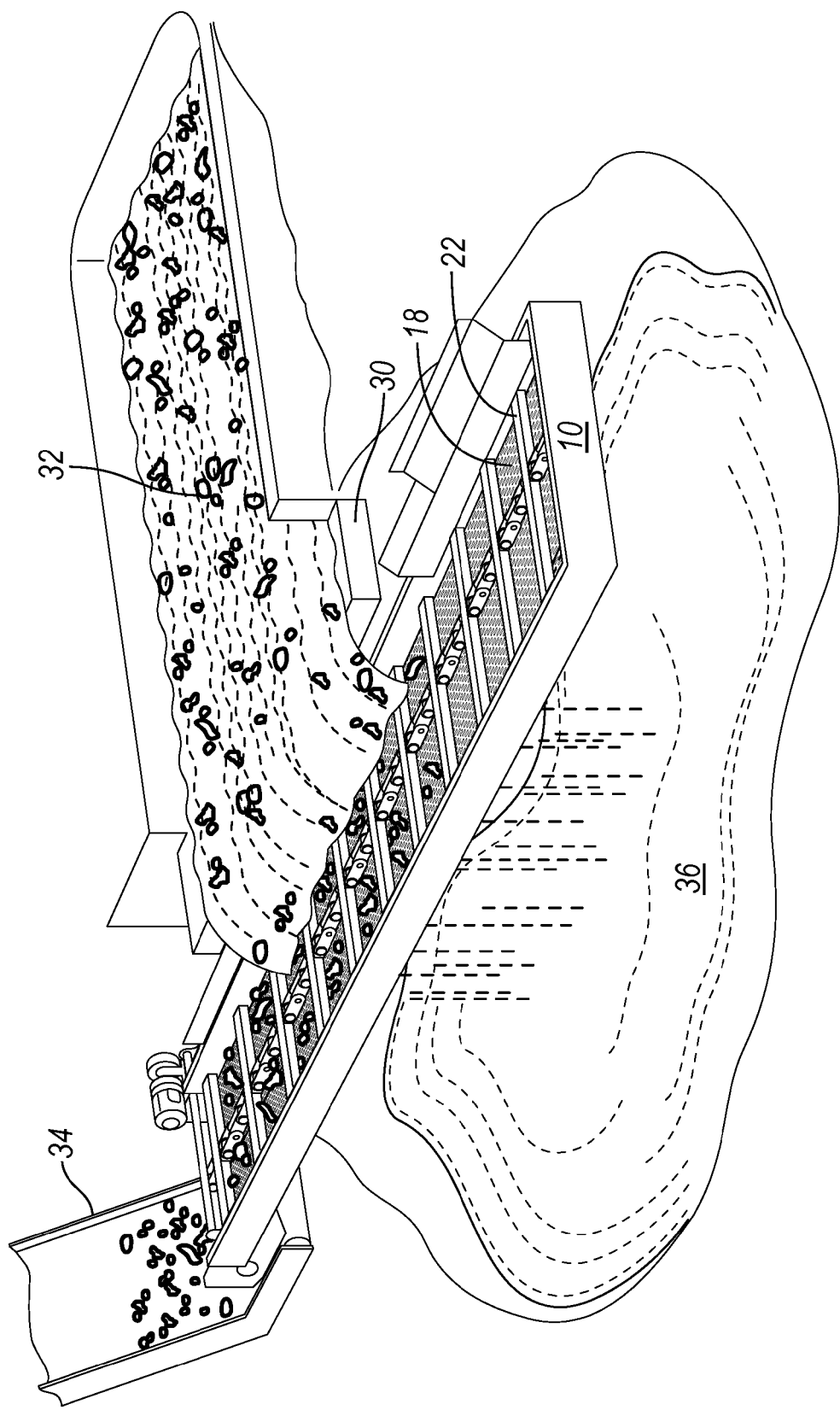
FIG. 2 is a diagram showing the debris separator of FIG. 1 positioned under a spillway to collect runoff including solid debris in communication with a conveyor to remove separated solid debris.

Referring now to FIG. 2, a diagram shows the debris separator 10 of FIG. 1 positioned under a spillway 30 of a collection pond 32 to collect runoff including solid debris. Debris separator 10 is in communication with a conveyor 34 onto which the separated solid debris that has been carried along the channel 18 by paddles 22 is dropped from the end of debris separator 10. The remainder of the slurry containing solid matter small enough to pass through the apertures 20 falls through the apertures in bottomplate 18 and collects in collection pond 36.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A separator system for separating solids from a slurry comprising:
    a spillway from a storage pit;
    a horizontal conveyor formed as a trough horizontally disposed across a flowpath of the slurry below the spillway, the trough including a channel defined by a pair of opposed side members extending upward from a bottom plate having a pattern of perforations sized to be large enough to pass the slurry including any suspended solids contained therein but small enough to trap solids having physical dimensions too large to pass through them;
    a continuous conveyor drive running along the center and the bottom of the trough in a direction parallel to the channel;
    a plurality of paddles extending across a width of the channel and longitudinally spaced from each other along the length of the channel, said continuous conveyor drive extending through a center of each of said spaced apart paddles and being affixed thereto, a downstream end of the trough being open, allowing the paddles to be pulled by the continuous conveyor around a pulley or wheel and then pass under the trough; and
    a conveyor below the downstream open end of said trough and positioned to catch solids that have been carried along by the paddles and convey said solids out of the slurry stream.

2. The separator system of claim 1 wherein the perforations in the bottom plate are in the form of rows of slots running along the length of the channel.

3. The separator system of claim 2 wherein the slots running along the length of the channel are about 0.25" by about 1" and provide about 35% open area in the bottom plate.

4. The separator system of claim 2 wherein adjacent rows of slots are offest from one another.

5. A method of separating animal waste into solids and liquids comprising the steps of:
    providing a separator system as set forth in claim 1;
    collecting an animal waste slurry containing solids and liquids in said storage pit;
    flowing said slurry over said spillway and on to said horizontal conveyor;
    allowing slurry containing solid matter small enough to pass through said perforations in said bottom plate, and into a collection pond, while solids that are too large to pass therethrough are carried by said paddles and drop onto said conveyor below the downstream end of said open trough.

6. A method as set forth in claim 5, wherein the slurry is animal waste from a dairy farm.

\* \* \* \* \*